June 15, 1926. 1,588,797
T. J. MELL
METHOD OF MANUFACTURING RUBBER SHEETS
Filed July 7, 1925   3 Sheets-Sheet 1
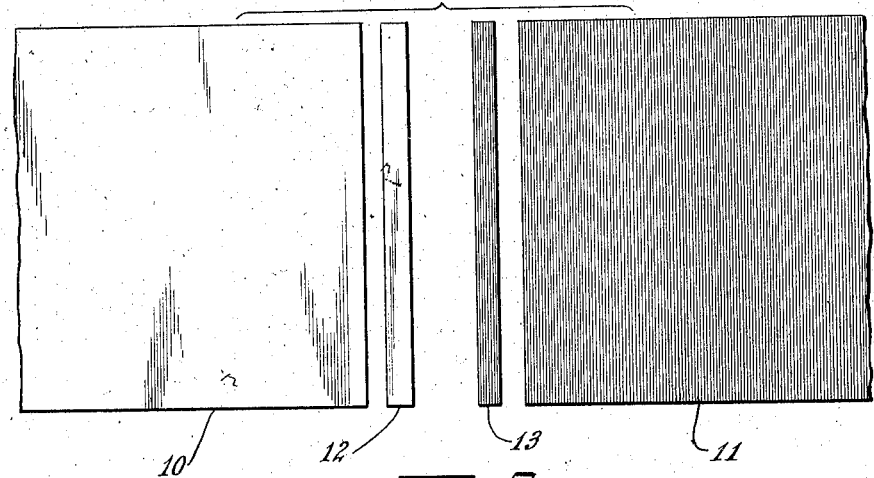
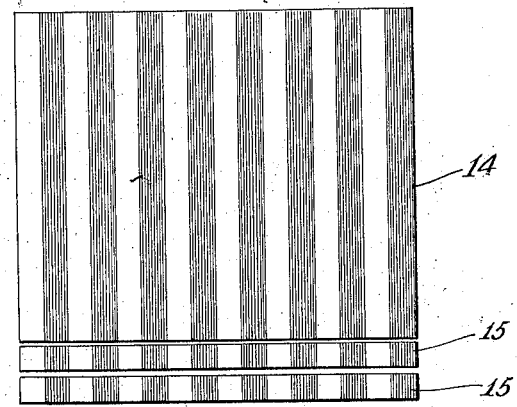
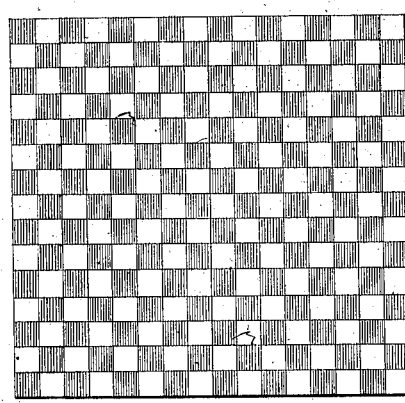
Inventor
Tod J. Mell

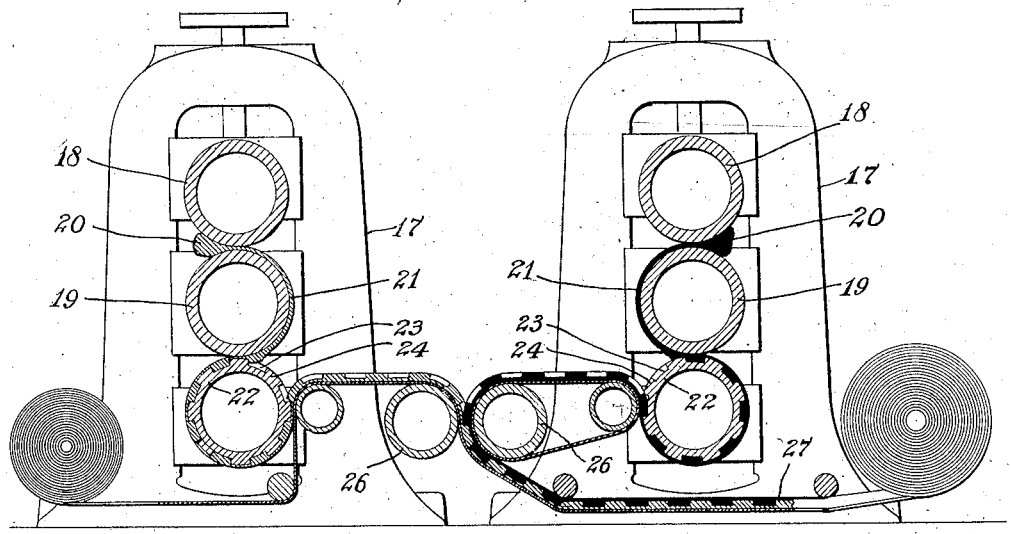
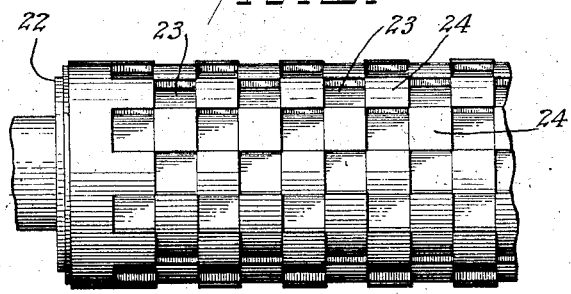
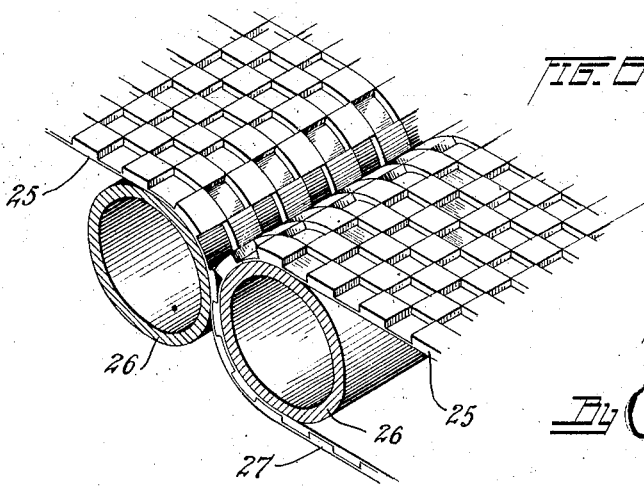

June 15, 1926.
T. J. MELL
1,588,797
METHOD OF MANUFACTURING RUBBER SHEETS
Filed July 7, 1925   3 Sheets-Sheet 3
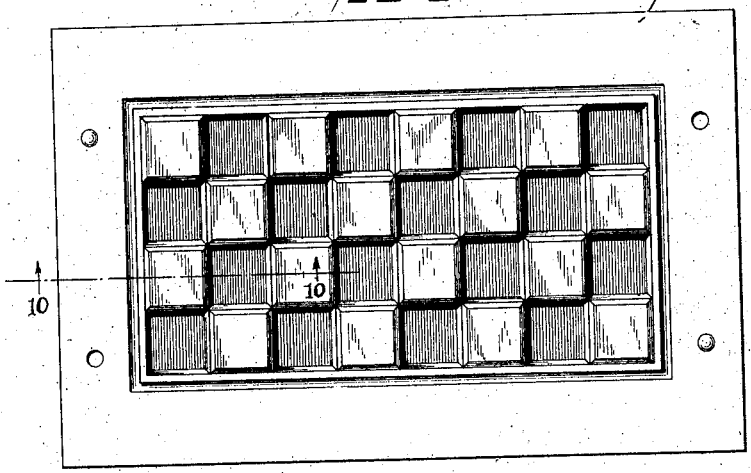
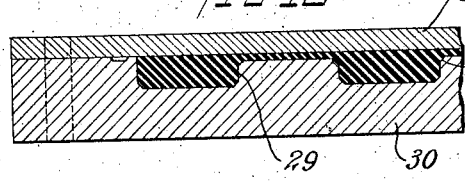
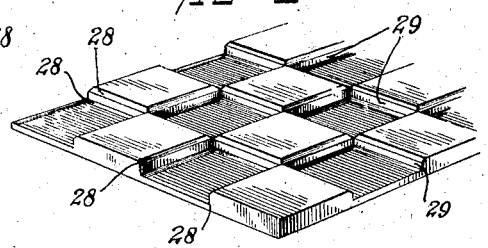
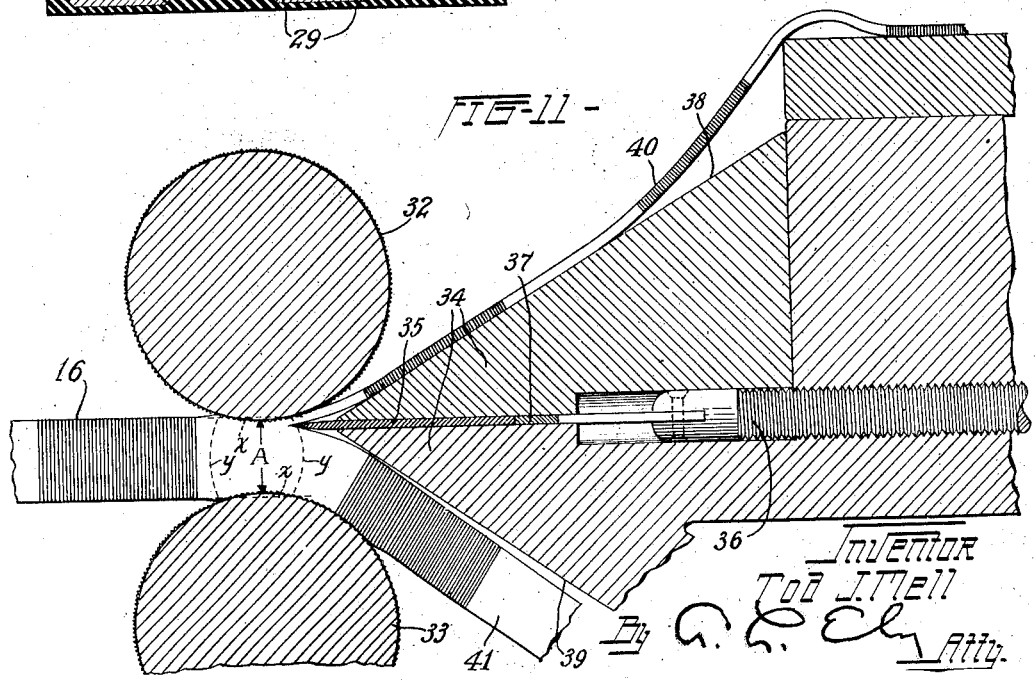
Inventor
Tod J. Mell
By G. L. Ely Atty.

Patented June 15, 1926.

1,588,797

UNITED STATES PATENT OFFICE.

TOD J. MELL, OF AKRON, OHIO.

METHOD OF MANUFACTURING RUBBER SHEETS.

Application filed July 7, 1925, Serial No. 42,001, and in France December 6, 1924.

This invention relates to the art of producing sheets of rubber or rubber-composition, and, while, one of its most valuable applications is in the manufacture of inlaid, mosiac, or other variegated or composite sheets suitable for use as floor coverings, mats or the like, it is applicable, in some of its aspects, to the production of either composite or homogeneous sheets suitable for those and other uses. The present application is a continuation in part of my application Serial No. 679,532, filed December 10, 1923.

Heretofore, so far as I am aware, rubber floor coverings and similar forms of sheet rubber have been produced wholly by operations directed to the formation of units of the material destined to constitute a single thickness, or less, of the final product, as distinguished from the formation of a mass adapted to be sliced into thin sheets having the desired characteristics.

The cutting of rubber, and especially of vulcanized rubber, has presented a problem in various situations because of the binding effect of the deformable, resilient, tough and frictional material upon the knife, these four characteristics combining to prevent a true and easy cut, and while in some situations the difficulties have been overcome by such expedients as water lubrication of the knife, and in others by heating of the knife as to raw rubber, for cutting rubber masses into relatively thick and non-extensive pieces, I am not aware that anyone in actual practice prior to my invention has successfully produced thin and extensive rubber sheets such as are required for floor coverings, for example, by the slicing of thicker sheets of corresponding extent, or has proposed procedure adequate for the accomplishment of that result.

In the present invention, the chief object of which is to provide more economical procedure and apparatus for producing sheet material of the character described, I have discovered that the accurate slicing of thin and extensive rubber sheets may be successfully performed, rapidly and at moderate expense, by imposing upon the rubber during the cutting operation compelling forces such as to suppress the manifestation of its physical properties of resilience and deformability, to which I find it chiefly owes its resistance to cutting. Such discovery has enabled me to produce very thin, accurate and extensive rubber sheets in an improved manner, which is of especial value in the production of mosaic or patterned sheets, wherein it avoids the tedious and expensive procedure of laying up and joining individual, single-thickness blocks, which has been the common practice heretofore in the production of rubber floor-covering material.

In order to avoid binding and frictional heating of the knife by the cut surfaces as they pass from the cutting edge, such as would interfere with the accuracy, ease and cleanness of the cutting operation, I find it to be important, while the rubber should be positively restrained adjacent and in advance of the line of cut, by forces acting in a direction substantially perpendicular to the plane of the cut, that it should be unrestrained immediately as it passes therefrom, so that the pressure upon it may not result in a gripping of the knife adjacent the latter's cutting edge, and I find that these desirable conditions are afforded by feeding the stock sheet between a pair of guiding and pressing rolls, of not too great diameter, and continuously slicing it at the delivery side of and very close to the nip of the rolls as it is so fed, the divergence of the roll surfaces from the nip permitting the stock to become unrestrained immediately as it passes the edge of the knife, when one or both of the resulting sheets is sufficiently thin to flex readily so as not to bear strongly against the knife. Inexpensive equipment, such as a common type of leather-splitting machine, for example, may be employed, although I prefer to employ presser rolls of which each is integral, for reasons hereinafter explained. I find not only that a clean and accurate cut of an extended rubber sheet may be obtained by the procedure herein described, but that when the rubber is closely held for the cutting and immediately released for passage over the knife, and the cut sheet is not so thick as to grip the knife strongly by reason of the forces acting upon the mass, the expedient of water lubrication, heretofore found so essential even in the cutting of rubber bodies of small section, may be dispensed with.

In attaining these results I find it to be important, especially in the case of previously vulcanized rubber, that the presser rolls be set so close together with relation to the normal thickness of the sheet as to reduce it considerably in thickness as it passes the nip of the rolls, the result apparently being to provide in advance of the knife a virtually rigid zone of rubber adapted constantly to serve in the manner of a backing plate for the knife, the latter constantly acting against it through a relatively thin layer of intervening rubber. In slicing a sheet 1/16 inch thick from a stock sheet one-half inch thick, for example, I find it desirable to set the rolls so that they will reduce the stock sheet about .015 inch, or about 3%, in thickness as it passes the nip, and for thinner stock sheets I find a higher percentage or flatwise compression of the sheet desirable, frequently employing as high as 7 or 8% compression in the thinner stock sheets.

The facility and smoothness of the cut when the stock sheet is compressed flatwise as described is apparently contributed to also by the fact that the rubber, being substantially incompressible as to volume, is displaced toward the knife by pressure of the rolls, in the interior of the stock sheet, and relatively retarded at and adjacent its faces, so that the rubber progressively meeting the cutting edge of the knife is held under tension in the direction of the thickness of the sheet and consequently is easily cut and does not strongly bind the knife adjacent its cutting edge.

The described action of the rolls upon the stock sheet being progressive and uniform, the knife encounters conditions in the adjacent rubber which are constantly uniform and are such as to provide a smooth, even cut and uniformity in the product, as distinguished from a knife forced through a mass of rubber compressed by forces acting in a direction parallel to the plane of the cut, as in guillotine cutters heretofore used for slicing bales of raw rubber.

The procedure described permits the slicing of previously vulcanized sheets many feet in width and of any length desired, and the progressive and uniform action of the rolls and also the setting of the stock sheet by vulcanization before the slicing operation contribute to the successful production of very large sheets from a relatively thick stock sheet made up of units of different colors without blending or permanent distortion of the differently colored elements.

Of the accompanying drawings:

Fig. 1 is a plan view of two sheets of rubber of different colors and strips cut therefrom, in accordance with my preferred procedure for preparing the stock sheet for the slicing operation without elaborate equipment.

Fig. 2 is a plan view of a composite sheet and strips cut therefrom, illustrating a later stage of this procedure.

Fig. 3 is a plan view of a stock sheet ready for slicing, as prepared by the procedure illustrated in Figs. 1 and 2.

Fig. 4 is a vertical section of apparatus including a pair of calenders for preparing the stock sheet by alternative procedure.

Fig. 5 is a fragmentary side elevation of one of the calender rolls on a larger scale.

Fig. 6 is a perspective view of a pair of rolls associated with the calenders and embossed sheets of rubber thereon in process of being joined in a composite sheet.

Fig. 7 is a perspective view of a portion of one of the embossed sheets.

Fig. 8 is a fragmentary section of the stock sheet prepared in accordance with Figs. 4 to 7 or by the procedure illustrated in Figs. 9 and 10.

Fig. 9 is a plan view of a mold adapted for the production of one of the embossed sheets such as is shown in Figs. 7, 8, or 10.

Fig. 10 is a section, on line 10—10 of Fig. 9, of the mold shown in Fig. 9 and a cover plate thereon with the stock in place in the mold.

Fig. 11 is a vertical section of the preferred apparatus for slicing the stock sheet and a stock sheet in process of being sliced therein.

Referring to the drawings, my preferred procedure for preparing the composite stock sheet without expensive equipment is shown in Figs. 1, 2 and 3, wherein 10 and 11 are respective sheets of rubber of different colors, and 12, 13 are strips cut from them respectively, as by feeding them past a set of water-lubricated slitting knives of known design adapted to cut against a backing such as a platen roll, the sheets preferably being of such moderate thickness as to be severed without great difficulty, and preferably being slightly vulcanized, merely to "set up" the stock, before this strip-forming operation.

A plurality of the strips 12, 13 thus formed are then cemented together, edge to edge, in alternation, as shown in Fig. 2, to provide a composite striped sheet 14. The sheet 14 may be sliced into a plurality of sheets of like extent and design, or, by procedure described with reference to Fig. 1, it may be cut, transversely of the stripes, into composite strips 15, 15 each consisting of joined blocks of rubber of the two colors in alternation, and a plurality of the strips 15 may be cemented together, edge to edge, as shown in Fig. 3, to provide a composite sheet 16 of checker-board design, for slicing into a plurality of sheets of like extent and design.

Alternative procedure and apparatus for preparing the stock sheet are shown in Figs.

4, 5 and 6. The apparatus of Fig. 4 comprises two calenders 17, 17, placed in opposing relation, each calender comprising three rolls, all of which are heated in any suitable manner. The upper rolls 18 and 19 are preferably smooth and a mass or bank of rubber compound 20 is placed at the entrance to the two upper rolls of each calender. This rubber compound is colored in any suitable manner and each calender operates upon a different colored stock, the two upper rolls of each calender forming the compounds into respective sheets 21, 21 of suitable thickness.

The lower roll 22 of each calender is formed with a series of depressions 23, 23 and projections 24, 24 and the depressions and projections on one roll are designed to mate with or be complementary to those on the other roll. As the rubber sheets pass from the respective rolls 23 onto the rolls 22, the pressure exerted by the rolls forces the rubber into the surface of the latter roll so that a sheet is formed similar to that shown at 25 in Fig. 6.

From the lower calender rolls of the respective calenders the rubber sheets are led to a pair of rolls 26, 26, which may also be heated if desired. These rolls are parallel and spaced slightly apart so that the two sheets of rubber meet and join together with their projections and recesses mating. The rolls 26 press and stick the sheets 25 together so that the composite sheet 27 is formed.

When the composite stock sheet is formed by this procedure each of the two constituent sheets is formed with an uninterrupted surface over one side, or, in other words, the pattern is not perforated or cut through each sheet, but is simply depressed or formed in relief. An advantage of this feature is that the uninterrupted surface layer of stock helps to maintain the sheet in its proper form without distortion or stretching prior to its vulcanization.

In the preparation of the composite stock sheet as above described it is preferable to have a tapered or oblique dividing plane between the blocks rather than a plane at right angles to the plane of the sheet. By this construction a better union is obtained between the different blocks, in addition to which feature the mating of the blocks is made more easily. As shown in Figs. 7 and 8, the tapering surfaces are provided near the top and bottom of each block or figure of the pattern as indicated by the numeral 28.

In certain patterns the tapered sides of the blocks or figures may be continued over the entire meeting surfaces, but in a design in which units or figures of the design are to meet at their corners only it is desirable to provide a slight area where the sides of the figures are vertical and to cut the composite sheet through the vertical surfaces. These vertical surfaces are designated by the numerals 29, 29.

In Figures 9 and 10 the separate sheets are molded in definite sizes in molds comprising a matrix or female mold 30 and a cover or lid 31. This procedure is similar to that shown in Figs. 4, 5 and 6 except that molds are substituted for the rolls.

However the composite stock sheet may be prepared, whether by one or another of the sets of operations above described, or otherwise, it is preferably given an almost complete vulcanization under pressure, as by heating it between press platens, after its parts have been assembled and before it is sliced into the thinner sheets, in order that its parts may be securely joined together and sufficiently stiffened to withstand the handling of it in the slicing and in subsequent operations and in order that an economy may be had by vulcanizing a comparatively large quantity of stock in the relatively thick sheet, in a single press, during the comparatively long period of the principal cure, as compared with several long curing periods required for vulcanizing the same quantity of stock in the form of single-thickness sheets.

A further advantage of forming a normally flat stock sheet of such thickness as to be sliced into several final sheets is that such slight and unavoidable non-uniformity in the thickness of the blocks as occurs results in a comparatively small distortion of the color elements in the pattern of the cut faces of the sheets, when the stock sheet is vulcanized under flattening pressure before the slicing, or results in a comparatively small unevenness in thickness of the sheets if the stock sheet is sliced before vulcanization, since the flow effects resulting from the relatively high compression of the thicker blocks are distributed among several sliced sheets instead of being localized in the two.

Still further advantages are that the shrinkage in all sheets sliced from the same stock sheet is the same, and that final stock sheets of very even thickness may be obtained, with consequent saving of material.

After the slicing operation the cut face of the sheet may be given a more highly finished surface by grinding or polishing it, or, preferably, by further vulcanizing it in contact with a suitable surfacing member.

Taking for example the preferred type of stock sheet 16 of Fig. 3, the slicing operation is performed as shown in Fig. 11, wherein the knurled-guiding and pressing rolls, preferably both driven at even speed, for feeding the sheet, are designated 32, 33, and the knife-guide, designated 34, is formed with a suitable guide-way for a band knife 35. The usual means including feed screws such as the screw 36 and guide plate 37 is provided for feeding the knife slowly toward the rolls to maintain its cutting edge at the same position notwithstanding the abrading away of its edge by the usual continuous sharpening means.

The knife-guide 34 is formed with an upper sheet-guiding face 38 sloping upwardly from the toe of the guide, adjacent the rolls, and an oblique, lower sheet-guiding face 39, the form of these faces of the guide permitting the latter to extend well inward between the rolls at their delivery side, to embrace and guide the knife close to its cutting edge, and also adapting the guide to spread apart the sliced sheet 40 and the remainder of the stock sheet, or residue, 41, as they are delivered from the rolls, and thus to prevent them from bearing strongly upon and being excessively heated and urged transversely of their proper course by the faces of the moving knife.

As the composite stock sheet 16 is fed forward past the knife by the presser rolls 32, 33 it is appreciably compressed flatwise, as above described and as shown in Fig. 11, the distance A preferably being at least 30% less than the normal thickness of the stock sheet (the lines $x$, $x$ indicating the thickness of the sheet when unrestrained), and by reason of the strong resilience and volumetric incompressibility of the rubber the latter behaves virtually as a rigid mass, with relation to the force imposed upon it by the knife in the plane of the cut, in passing toward the knife from the most constricted part of the nip. Also the condition of forward displacement of rubber in the interior of the sheet by the pressure of the rolls apparently results in a tension in the sheet at the line of cut, in the direction of the thickness of the sheet (a normal cross-sectional zone of the rubber assuming the position indicated by the lines $y$, $y$ in Fig. 11), and this apparently facilitates the severance of the stock and avoids binding of the knife, the cutting edge of the knife preferably being maintained, as shown, closely adjacent but not within the region of greatest flatwise compression of the sheet.

Whatever the predominating factor may be, whether it is the rigid backing plate effect of the rubber gripped between the rolls, or the transverse tensioning of the stock at the line of cut, or, as I believe to be the case, a combination of these two features, I find that greatly superior results are obtained by setting the rolls so close together as substantially to reduce the thickness of the sheet as it passes between them, as compared with merely gripping the sheet sufficiently to prevent slippage of the rolls thereon. The rubber is completely prevented from clinging to the knife with the inward-rolling, friction-increasing effect which is readily noticeable in merely forcing a knife into an unrestrained block of resilient rubber.

This result also is apparently contributed to by the relatively stiff, springy character of the split sheets as compared with the non-resiliently flexible character of leather, the spreading apart of the split rubber sheets by the knife-guide serving to help maintain a tension in the direction of the thickness of the stock sheet at the line of cut.

A feature of the preferred apparatus here shown is the integral character of each of the presser rolls, as distinguished from similar machines as commonly used for the splitting of leather, wherein one of the feed rolls is made up of a series of short roll members or sections journaled with substantial play upon a common axle and held against the work by resilient means such as a rubber covered roll bearing upon their peripheries, so that they may yield individually to compensate irregularities in the thickness of the hide or leather being split. I find it to be important that the rubber stock sheet be of substantially uniform thickness and of normally plane surface and that it be compressed flatwise substantially to the same extent at all points along the nip of the rolls, for uniformity in the thickness of the product, since the resiliently deformable character of the rubber otherwise results in a wavy surface in the sliced sheet even though the line of cut through the unequally deformed sheet be perfectly straight.

I find also that the play permitted between the members of the sectional rolls commonly employed in leather splitting machines and their axle member frequently results, when the machine is used for splitting vulcanized rubber, in the said members assuming different eccentric positions with relation to their axle member and consequently bearing upon the work with unequal and unaligned forces and thus failing to provide the desired uniform impelling and compressing effect, their assumption of such different positions apparently being due to the resiliently deformable, volumetrically incompressible and frictional character of the rubber as distinguished from the truly compressible, comparatively non-resilient and lifeless character of hides or leather.

By the procedure described I obtain progressive cutting of the rubber under conditions which are uniform as to various points along the line of cut, and are also constantly uniform, from moment to moment, and these conditions include a continuous, progressive holding of the cut sheets out of strong frictional engagement with the faces of the knife. These advantageous conditions and other advantages of my invention are not restricted to the exact illustration of my invention herein described, and consequently I do not wholly limit my claims to the exact procedure or the specific construction of apparatus which I have chosen for the purpose of illustration herein.

I claim:

1. The method of manufacturing rubber sheeting which comprises forming a variegated stock sheet of rubber having internal lines of color division and of such extent as to be sliced into serviceable sheeting units and slicing a coextensive sheet therefrom while progressively pressing the stock sheet flatwise adjacent and in advance of the line of cut and releasing it as it is cut, in such manner as to provide uniform conditions of stress in the stock at the line of cut, the stock being subjected to vulcanization before the slicing operation.

2. The method of manufacturing rubber sheeting which comprises forming a relatively thick, extensive mass of rubber by assembling and joining bodies of rubber of different colors, and slicing a thin and extensive sheet therefrom, by a cut crossing lines of color division therein, while confining the rubber closely in advance of the cutting element, by forces acting in a direction substantially perpendicular to the plane of the cut, and progressively releasing the cut sheet from such confinement as it is cut.

3. The method of manufacturing rubber sheeting which comprises forming a variegated, extensive sheet of rubber having internal lines of color division, passing the same between a pair of guide rolls, and cutting a relatively thin, coextensive slice therefrom as it emerges from the nip of the rolls, the line of cut crossing lines of color division in the sheet and being maintained substantially parallel to and closely adjacent the nip of the rolls.

4. The method of manufacturing rubber sheeting which comprises assembling and joining edge-to-edge rubber blocks of approximately uniform thickness and of different colors to form an extensive, normally flat, variegated sheet, passing said sheet repeatedly between guide rolls and cutting a relatively thin, coextensive slice from the sheet at each passage through the rolls, the line of cut being maintained closely adjacent and substantially parallel to the nip of the rolls, at the delivery side thereof, whereby the effect of such inequality as occurs in the thicknesses of the blocks is taken in part by each of the several slices.

5. The method of manufacturing rubber sheeting which comprises slicing a thin and extensive sheet from a mass of previously vulcanized stock of such extent in the plane of the cut as to provide a serviceable sheeting unit, and thereafter further vulcanizing said sheet.

6. The method of manufacturing rubber sheeting which comprises forming an extensive mass of vulcanized rubber by assembling and joining bodies of rubber of different colors, slicing a thin and extensive sheet therefrom by a cut crossing lines of color division therein, and thereafter further vulcanizing the sheet so produced.

7. The method of manufacturing rubber sheeting which comprises forming separate masses of rubber of different colors, partially vulcanizing said masses, joining said masses in a composite sheet, further vulcanizing the composite sheet, cutting a slice from said composite sheet by a cut crossing lines of color division therein, and further vulcanizing said slice.

8. The method of manufacturing rubber sheeting which comprises assembling and joining rubber blocks of substantially uniform thickness and of different colors to form an extensive, normally flat, variegated sheet, subjecting said sheet to nearly complete vulcanization, passing said sheet between a pair of guide rolls and cutting a relatively thin, coextensive slice therefrom as it emerges from the nip of the rolls, and thereafter further vulcanizing the slice with its cut face in contact with a surfacing member.

9. The method of manufacturing rubber sheeting which comprises cutting strips from stock sheets of rubber of different colors, joining said strips to produce a composite sheet having stripes of alternate colors, cutting said composite sheet into strips by cuts crossing the color stripes therein to produce variegated strips, joining said variegated strips to produce a composite stock sheet, and cutting a coextensive slice from the last mentioned sheet while maintaining a uniform condition of non-binding spread of the slice and residue as the line of cut is advanced through the sheet.

10. The method of manufacturing rubber sheeting which comprises almost completely vulcanizing an extensive sheet of rubber, cutting a coextensive slice therefrom, and then further vulcanizing said slice.

11. The method of manufacturing rubber sheeting which comprises feeding a sheet of previously vulcanized rubber between a pair of compression rolls and cutting a coextensive slice from the sheet as it emerges from the nip of the rolls, by continuously driving a knife in the same direction lengthwise of the rolls, substantially without lubrication of the knife, while maintaining the cutting edge of the knife parallel to and closely adjacent the rolls but at such distance from the medial line of their nip as to cut in a region of tension, the slice being of such extent in the plane of the cut as to provide a serviceable sheeting unit.

12. The method of manufacturing rubber sheeting which comprises passing a relatively thick, normally flat sheet of previously vulcanized rubber of substantially even thickness between a pair of compression rolls and cutting a relatively thin, coextensive slice therefrom as it emerges from the nip of the rolls, the line of cut being maintained substantially parallel to and closely adjacent the nip of the rolls, by constantly driving a knife in the same direction lengthwise of the rolls, the rolls being held so closely spaced and the line of cut being so spaced from the medial line of their nip as to maintain a condition of uniform tension in the sheet in the direction of its thickness at the line of cut, and the sheet being of such extent in the plane of the cut as to provide a serviceable sheeting unit.

13. The method of cutting vulcanized rubber which comprises passing a body of the said rubber between a pair of compression rolls and cutting a slice therefrom as it emerges from the nip of the rolls, the line of cut being maintained substantially parallel to and closely adjacent but at a substantial distance from the medial line of the nip of the rolls, by driving a knife lengthwise of the rolls and constantly in the same direction throughout an extensive cutting of the slice.

14. The method of cutting vulcanized rubber which comprises passing a body of the said rubber between a pair of compression rolls and cutting a slice therefrom as it emerges from the nip of the rolls, the line of cut being maintained substantially parallel to and closely adjacent but at a substantial distance from the medial line of the nip of the rolls, by driving a knife lengthwise of the rolls, and the rubber being maintained under tension in a direction approximately perpendicular to the knife at the line of cut.

15. The method of cutting previously vulcanized rubber which comprises so compressing and releasing a body of the said rubber as to create a tension therein progressively along the body, and cutting the said body by such movement of a knife as to maintain the latter with its cutting edge within the progressing tension zone of the rubber and as to cause the knife to cut in a direction approximately perpendicular to the lines of tension at its cutting edge.

In witness whereof I have hereunto set my hand this June, 1925.

TOD J. MELL.